April 22, 1924.
N. H. FOOKS
1,491,092
HEAT TREATING SUBSTANCE PACKED IN SEALED RECEPTACLES
Filed Feb. 4, 1922
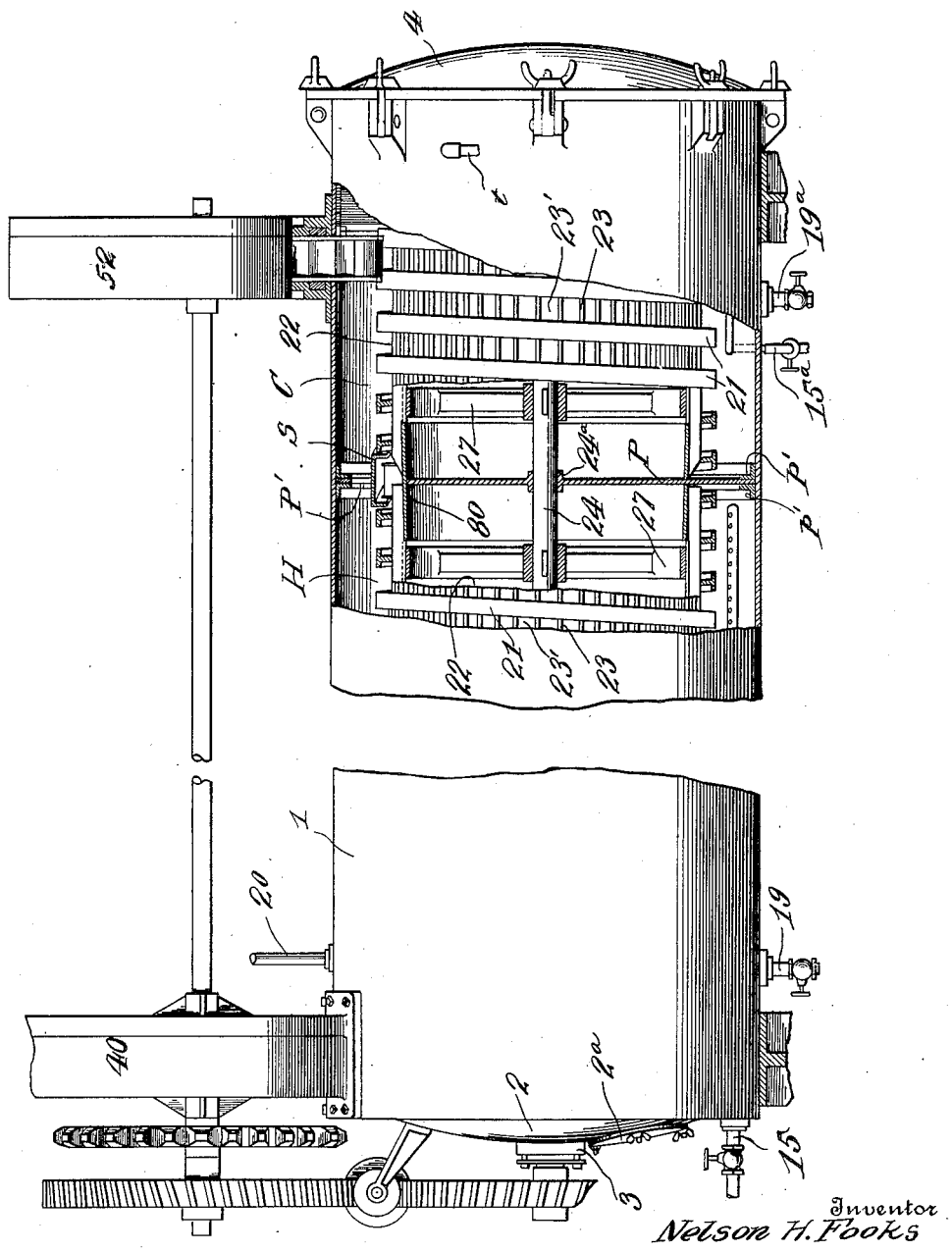
Inventor
Nelson H. Fooks
By Mason, Fenwick & Lawrence
Attorneys Patented Apr. 22, 1924.

1,491,092

UNITED STATES PATENT OFFICE.

NELSON H. FOOKS, OF PRESTON, MARYLAND.

HEAT-TREATING SUBSTANCE PACKED IN SEALED RECEPTACLES.

Application filed February 4, 1922. Serial No. 534,236.

*To all whom it may concern:*

Be it known that I, NELSON H. FOOKS, a citizen of the United States, residing at Preston, in the county of Caroline and State of Maryland, have invented certain new and useful Improvements in Heat-Treating Substances Packed in Sealed Receptacles; and I do hereby declare the following to be a full, clear, and exact description of the invention, such as will enable others skilled in the art to which it appertains to make and use the same.

This invention relates to continuous processes of heat treating foods or other substances packed in sealed receptacles. It particularly concerns continuous processes of cooking or sterilizing foods in hermetically sealed receptacles, such as tin cans, under relatively high heat and pressure.

Its object is to enable sealed receptacles containing food to be subjected to heat, higher than 212° F., under pressures greater than normal atmospheric pressure and to be cooled under similar high pressure in a retort or like container by a continuous process, whereby the receptacles, when discharged into the outer atmosphere, will have had their contents adequately cooked or sterilized and the temperature so reduced before discharge from the retort that the internal pressure will not be sufficient to strain or rupture them when discharged into the external atmosphere.

The best heat transferring mediums for cooking and sterilizing purposes now known are liquids, or vapors that condense to liquid form at ordinary temperatures.

In my Patent No. 1,354,962 I have disclosed a method and apparatus for successively heating and cooling food or other substances, packed in sealed receptacles, by passing said receptacles in procession successively through a heating medium consisting of water or other liquid raised to a temperature higher than its boiling point in the external atmosphere, but prevented from boiling by a fixed gas held under pressure over the water, and through a mass of cooling liquid held under the same pressure of the same body of gas until the receptacles are sufficiently cool to avoid danger of straining or rupture when subjected after treatment to the reduced pressure of the external air. Should the conveying mechanism within a retort in which water or other liquid is the cooking or heating medium, become choked or broken in operation, it would be necessary to drain off the water in order to obtain access to the interior of the retort and effect the removal of the obstruction or make other necessary repairs. It necessarily requires considerable time to drain off the superheated water and allow the chamber to cool sufficiently to permit men to work within it. By the use of my present method I am able to continuously heat a procession of food receptacles by means of steam or water vapor, similarly cool them in water under pressure without excessive waste of steam occurring with the admission of the receptacles into and discharge of them from the retort; and also to secure the advantage, in case of obstruction of the conveying mechanism, of being able to quickly blow off the aeriform fluid contained within the cooking chamber whereby little time need be lost in making needed repairs. In the apparatus that I prefer to use to carry out this process, a body of cooling liquid, such as water, is maintained in one chamber of a retort and is held under pressure higher than atmospheric by a cooking medium consisting of air saturated with steam filling another chamber and overlying the water by reason of an always open passageway between said chambers at the upper part of the retort.

In the accompanying drawing I have shown in side elevation, partly in section, one form of apparatus by which this process may be practiced.

For illustrative purposes the drawing discloses a retort or closed container comprising an outer cylindrical shell 1 closed at one end by a convex head 2 having a man hole and cover 2ª and, in the center thereof, a stuffing box 3 through which extends a shaft 24 for the purpose of operating a reel or revoluble carrier for causing the cans or other receptacles to be moved in continuous procession through the retort or container. The other end of the shell is closed by a head which may be a door 4 by which, also, access may be had to the interior. In the top of the shell are a plurality of ports preferably in horizontal alinement. One of the ports is at the left of the retort as indicated in the drawing and serves to admit cans or other objects into that end of the retort. The other or discharge port is indicated near the right of the drawing and is the port through which the cans or other objects are discharged from the retort. Over the ports are secured casings 40 and 52, respectively, each casing housing a rotary pocketed valve or air lock; that at the left being adapted to charge or feed the objects into the retort without materially reducing the pressure therein and that at the right being adapted to similarly discharge treated objects. The charging and discharging means may be of the type illustrated and described in my prior United States Patent No. 1,363,103, patented December 21, 1920. The retort is divided into two chambers H and C by a transverse partition P which may be suitably insulated, if desired, and may be secured to the cylindrical shell 1 by means of two annular angle bars $p'$ or by any other suitable means. The partition P does not completely separate the two chambers H and C but stops short of the top of the shell 1 in order to provide free communication through a passage P', always open, between the upper portions of said chambers to allow free movement of aeriform fluid within the retort from one chamber to the other and admit of the passage of cans or other objects being treated from the chamber H to the chamber C. The chamber H is designed to be completely filled with a fixed gas, such as air, under pressure, saturated with hot liquid vapor, such as water vapor; and the chamber C is designed to receive a body of cooling liquid, such as water, into which the cans or the like are introduced after the cooking or other high heat treatment to which they have been subjected in their passage through the vapor saturated gas under pressure in the chamber H, the said saturated gas overlying the body of cooling liquid and maintaining it under the same pressure as exists in the chamber H.

In order to introduce air, which is the most suitable fixed gas for use in my process, an inlet pipe 20 is provided which, it will be understood, is connected with an air compressor or suitable source of compressed air whereby the retort or container may be filled with air under any pressure sustainable by the retort. In order to introduce steam or other liquid vapor the pipe 15 may be led into the lower portion of said retort, it being designed that the pipe 15 shall be connected to a boiler (not shown) under sufficient pressure to force the steam into the container against the pressure of the air forced through said pipe 20. The pipe 15 may be controlled by a suitable hand valve and may have an extension within the chamber H provided with perforations to allow the steam to escape into the compressed air. A drain pipe 19 may be provided for the purpose of draining off water of condensation.

Cooling water may be admitted continuously into the chamber C by a pipe 15$^a$ and may overflow continuously therefrom through an outlet pipe $t$ which may be connected to a suitable trap. In order to force the water in against the pressure of the air held within the retort a force pump (not shown) may be used or the water may be taken from a stand pipe of such head or elevation as will overcome the pressure within the retort. Thus a constant circulation of water may be kept flowing through the chamber C in order to keep the temperature sufficiently low for the purposes in view. Chamber C may be emptied through drain pipe 19$^a$.

As an exemplary means for moving the cans or other objects through the chambers over the longest practicable path so that they may be submerged in the heating medium and subjected to a high temperature during a period long enough to cook or sterilize them thoroughly and a lower temperature long enough to cool them sufficiently, helical guides 21 may be fixed within the shell 1 between the inlet valve and the partition P and between said partition and the outlet valve. A rotary rack 22, divided by said partition into sections, each comprising longitudinal flights or guide ribs, each flight formed by a flange 23 of an angle iron the other flange 23' of which constitutes a shelf for supporting the objects, is mounted within the turns of said helical guides 21 and concentric therewith. The guides 21 may be formed of T-section metallic shapes, bent into helical coils with the flanges on the convex side forming, as it were, single threaded screws, the insides of adjacent overlapping flanges of the T-irons constituting the tracks or surfaces upon which the cans or other bodies are rolled or otherwise moved by the ribs 23 of the rotary rack. The said ribs are spaced apart a distance to receive the cans or other objects between them and as the said objects roll or move along the helix formed by the turns of the guides 21, they are also pushed by the latter longitudinally of the rack, always toward the discharge valve. The flights 23, 23' may be carried on the peripheries of wheels or spiders 27 keyed or otherwise secured to a shaft 24 which projects at one end through the bearing boss 3 in the center of the head 2 and through a suitable stuffing box. The other end of said shaft 24 may be journaled in a hanger on the inside of the retort adjacent the door 4, as shown in my prior United States Patent No. 1,363,103, patented December 21, 1920, or in any suitable manner. Between its end said shaft 24 rotates in a fluid tight journal box 24$^a$ in the partition P. The turns of the helical guides 21 in chambers H and C are so positioned with respect to the partition P that when a can has travelled through the heating chamber H to the partition it is in position to be shifted through the opening P' into the adjacent chamber C in order that it may be moved through the latter and through the cooling liquid therein. To shift the cans from one rack section to the other across the partition P it is necessary to move the cans endwise a distance equal to the space between two turns of the guides 21 within a distance of their helical course equal substantially to the circumferential extent of the opening P' in the partition. For this purpose a cam or crossover device S of greater pitch than the guides 21 is fixed with respect to said guides. This crossover may be, as shown, a channel iron secured to said helical guide members and so constructed and arranged as to shunt the cans from the delivering end of the rack section in one chamber to the receiving end of the rack section in the other chamber, as disclosed in my prior Patent No. 1,402,488, patented January 3, 1922. In accordance with the disclosures of said patent a curved plate 80 may be provided in order to afford an unobstructed surface for the passage of cans from one rack to the other.

It will be understood that suitable provisions are made at the receiving end of the retort whereby the cans or the like, to be treated, may be delivered successively one by one from the inlet valve in casing 40 into the receiving end of the rack and within the starting end of the helical guideway, and that suitable provisions are made at the delivery end of the rack whereby the cooled cans or the like may be removed from the retort by means of the discharge valve in the casing 52 at the delivery end,—all as more fully disclosed in my prior patents referred to herein.

In practice water should be kept in the chamber C at a suitable level determined by the height of the outflow pipe. Air should be forced in through the pipe 20 until the required pressure is reached within the retort. The air under pressure within the retort may then be heated by opening the valve in the steam pipe 15 and forcing the steam into the air until the proper temperature is attained at the pressure suitable therefor. The retort may be charged, for example, with compressed air at a gage pressure of fifteen pounds; steam may be admitted from a boiler where the gage indicates a pressure of say eighty pounds until a temperature of say 240° F. is indicated within the retort, at which temperature water would not boil within the retort under said pressure of fifteen pounds. There is then within the chamber a body of air under high pressure saturated with steam or water vapor and said saturated air overlies the water in the cooling chamber C. Thus, with a comparatively small volume of steam in the space through which the objects to be treated are passed, a temperature may be attained within the heating chamber as far above 212° F. as may be desired for the purpose in view, and the air pressure maintained high enough to prevent the boiling of water within the vessel at the temperature desired.

The passageway between the two chambers H and C being always open, there will be the same pressure in the chamber C as in the chamber H. The water may be kept at a sufficiently low temperature by continually forcing it into the chamber C and allowing it to waste through the pipe t. As there is no valve separating the chambers, cans or the like may be passed from the heating chamber to the cooling chamber with facility without reduction of external pressure on them, the same pressure being held in both chambers and in the passage P'. The absence of a valve between the chambers simplifies the structure. The receptacles may be fed into one end of the heating chamber H, in succession, submerged in and moved in a procession through the steam saturated air therein, into and through the body of cooling water in the cooling chamber and out through the discharge valve without wasting any considerable amount of steam and heat into the external atmosphere.

Having described my invention what I claim and desire to secure by Letters Patent is:

1. A continuous process of heat treating alimentary substances in sealed receptacles, which consists in maintaining within a retort or like container, under pressures higher than that of the atmosphere surrounding the retort, a heated medium comprising a body of fixed gas, saturated with vapor, and a cooling medium consisting of a body of liquid maintained at a lower temperature; introducing the receptacles successively into the retort, submerging them in the heating medium until their contents are cooked or sterilized, then subjecting them to contact with the cooling medium until their temperature and internal pressure are sufficiently reduced, and then removing them successively from the retort,—all as a continuous operation.

2. A continuous process of heat treating alimentary substances in sealed receptacles which consists in maintaining within a retort or like container, under pressure higher than that of the atmosphere surrounding the retort, a heated medium consisting of a body of fixed gas, saturated with vapor, and a cooling medium consisting of a body of liquid maintained at a lower temperature than and overlaid by said heating medium; introducing the receptacles successively into the retort, submerging them in the heating medium until their contents are cooked or sterilized, then subjecting them to contact with the cooling medium until their heat and internal pressure are sufficiently reduced, and then removing them successively from the retort,—all as a continuous operation.

3. A continuous process of heat treating alimentary substances in sealed receptacles which consists in maintaining within a retort or like container, under pressure higher than that of the atmosphere surrounding the retort, a heating medium consisting of a body of fixed gas and a cooling medium consisting of a body of liquid constantly flowing through said retort and maintained at a lower temperature than and overlaid by said heating medium; introducing the receptacles successively into the retort, submerging them in the heating medium until their contents are cooked or sterilized, then subjecting them to contact with the cooling medium until their heat and internal pressure are sufficiently reduced, and then removing them successively from the retort,—all as a continuous operation.

4. A continuous process of heat treating alimentary substances in sealed receptacles which consists in maintaining within a chamber, under pressure higher than that of the atmosphere surrounding said chamber, a heating medium consisting of fixed gas saturated with vapor; maintaining in another chamber, under pressure higher than atmospheric, a body of cooling liquid; introducing the receptacles successively into the chamber containing the heating medium subjecting them continuously to the heat of the heating medium until their contents are cooked or sterilized, transferring them to the chamber containing the cooling liquid without materially reducing the external pressure on them, subjecting them to the cooling action of the cooling liquid until their temperature and internal pressure are sufficiently reduced, and then removing them successively from the cooling chamber,—all as a continuous operation.

5. A continuous process of heat treating alimentary substances in sealed receptacles within a retort or like container divided into chambers having an always open passageway between them; said process consisting in maintaining a body of cooling liquid in one chamber and a heating medium overlying said liquid and filling the remainder of the space in said chambers, said heating medium consisting of a fixed gas saturated with vapor and held under pressure higher than that of the atmosphere surrounding the retort; introducing the receptacles successively into the retort, submerging them in and moving them through the heating medium until their contents are cooked or sterilized and then through the passageway into and through the cooling liquid and out of the retort in succession,—all as a continuous operation.

6. A continuous process of heat treating alimentary substances in sealed receptacles within a retort or like container divided into chambers having an always open passageway between them; said process consisting in causing water to flow through one chamber while kept at a constant depth therein, maintaining a heating medium overlying said water and filling the remainder of the space in said chambers, said heating medium consisting of air saturated with vapor and held under a pressure higher than that of the atmosphere surrounding the retort; introducing the receptacles successively into the container, submerging them in and moving them through the heating medium until their contents are cooked or sterilized and then through the passageway into and through the cooling liquid and out of the container in succession,—all as a continuous operation.

In testimony whereof I affix my signature.

NELSON H. FOOKS.